US008725861B2

(12) United States Patent
Weller et al.

(10) Patent No.: US 8,725,861 B2
(45) Date of Patent: *May 13, 2014

(54) CONTENT DELIVERY NETWORK SERVICE PROVIDER (CDNSP)-MANAGED CONTENT DELIVERY NETWORK (CDN) FOR NETWORK SERVICE PROVIDER (NSP)

(75) Inventors: Timothy N. Weller, Boston, MA (US); Charles E. Leiserson, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,366

(22) Filed: Jan. 30, 2012

(65) Prior Publication Data
US 2012/0130871 A1    May 24, 2012

Related U.S. Application Data (60) Continuation of application No. 12/951,091, filed on Nov. 22, 2010, now Pat. No. 8,108,507, which is a continuation of application No. 12/122,764, filed on May 19, 2008, now Pat. No. 7,840,667, which is a continuation of application No. 11/636,849, filed on Dec. 11, 2006, now Pat. No. 7,376,727, which is a division of application No. 10/114,080, filed on Apr. 2, 2002, now Pat. No. 7,149,797.

(60) Provisional application No. 60/280,953, filed on Apr. 2, 2001.

(51) Int. Cl.
*G06F 15/173* (2006.01)

(52) U.S. Cl.
USPC ........... 709/223; 709/218; 709/220; 709/224; 370/254; 705/1.1; 705/30; 705/59

(58) Field of Classification Search
USPC .......... 709/223, 224, 246, 218, 220; 455/517; 370/254; 705/1.1, 30, 59
See application file for complete search history.

(56) References Cited

U.S. PATENT DOCUMENTS

| 6,829,654 | B1 * | 12/2004 | Jungck | 709/246 |
| 7,299,291 | B1 * | 11/2007 | Shaw | 709/231 |
| 7,711,647 | B2 * | 5/2010 | Gunaseelan et al. | 705/59 |
| 7,852,789 | B2 * | 12/2010 | Satterlee et al. | 370/255 |
| 8,108,507 | B2 * | 1/2012 | Weller et al. | 709/223 |
| 8,307,088 | B2 * | 11/2012 | Leighton et al. | 709/226 |

(Continued)

*Primary Examiner* — Thu Ha Nguyen
(74) *Attorney, Agent, or Firm* — David H. Judson (57) ABSTRACT A CDN service provider shares its CDN infrastructure with a network to enable a network service provider (NSP) to offer a private-labeled network content delivery network (NCDN or "private CDN") to participating content providers. The CDNSP preferably provides the hardware, software and services required to build, deploy, operate and manage the CDN for the NCDN customer. Thus, the NCDN customer has access to and can make available to participating content providers one or more of the content delivery services (e.g., HTTP delivery, streaming media delivery, application delivery, and the like) available from the global CDN without having to provide the large capital investment, R&D expense and labor necessary to successfully deploy and operate the network itself. Rather, the global CDN service provider simply operates the private CDN for the network as a managed service.

3 Claims, 4 Drawing Sheets

(56) References Cited

U.S. PATENT DOCUMENTS

| | | | |
|---|---|---|---|
| 2002/0010798 A1* | 1/2002 | Ben-Shaul et al. | 709/247 |
| 2002/0037734 A1* | 3/2002 | McKenna et al. | 455/517 |
| 2003/0149581 A1* | 8/2003 | Chaudhri et al. | 705/1 |
| 2004/0073596 A1* | 4/2004 | Kloninger et al. | 709/200 |
| 2004/0225723 A1* | 11/2004 | Cherkasova | 709/219 |
| 2005/0278259 A1* | 12/2005 | Gunaseelan et al. | 705/59 |
| 2006/0069767 A1* | 3/2006 | Motoyama et al. | 709/224 |
| 2006/0112176 A1* | 5/2006 | Liu et al. | 709/223 |

\* cited by examiner

CONTENT DELIVERY NETWORK SERVICE PROVIDER (CDNSP)-MANAGED CONTENT DELIVERY NETWORK (CDN) FOR NETWORK SERVICE PROVIDER (NSP)

This application is a continuation of Ser. No. 12/951,091, filed Nov. 22, 2010, now U.S. Pat. No. 8,108,507, which application was a continuation of Ser. No. 12/122,764, filed May 19, 2008, now U.S. Pat. No. 7,840,667, which application was a continuation of Ser. No. 11/636,849, filed Dec. 11, 2006, now U.S. Pat. No. 7,376,727, which application was a division of Ser. No. 10/114,080, filed Apr. 2, 2002, now U.S. Pat. No. 7,149,797, which application was based on Ser. No. 60/280,953, filed Apr. 2, 2001.

BACKGROUND OF THE INVENTION

1. Technical Field

The present invention relates generally to delivery of digital content over a distributed network.

2. Description of the Related Art

It is well-known to deliver digital content (e.g., HTTP content, streaming media and applications) using an Internet content delivery network (ICDN). A content delivery network or "CDN" is a network of geographically distributed content delivery nodes that are arranged for efficient delivery of content on behalf of third party content providers. A request from a requesting end user for given content is directed to a "best" replica, where "best" usually means that the item is served to the client quickly compared to the time it would take to fetch it from the content provider origin server.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. In addition, the CDN infrastructure typically includes network monitoring systems to continuously monitor the state and health of servers and the networks they are in, a network operations command center (NOCC) that monitors the state of the network on a 24×7×365 basis, a customer-facing extranet portal through which CDN customers obtain real-time and historical usage information and access to content management provisioning tools and the like, administrative and billing systems, and other CDN infrastructure and support. Some CDN service providers provide ancillary infrastructure and services such as high performance, highly-available, persistent storage, tiered distribution through cache hierarchies, edge content assembly, content targeting, and the like.

An effective CDN serves frequently accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN that provides web content, media streaming and application delivery is available from Akamai Technologies, Inc. of Cambridge, Mass.

Implementation, operation and management of a global distributed network—such as an Internet CDN—is a complex, costly and difficult endeavor. A large CDN may have thousands of servers operating in hundreds of disparate networks in numerous countries worldwide. Typically, the CDN service provider (a CDNSP) does not own physical support infrastructure (i.e., networks, buildings, and the like) on which the CDN servers run, nor does the CDNSP necessarily have the capability of administrating those servers that are often deployed throughout the world. Rather, the service provider must deploy and then remotely administer these services and applications as what is, in effect, a virtual network overlaid on the existing (often third party owned and controlled) physical networks and data centers.

Many network service providers desire to provide content delivery services, however, the cost of designing, installing, managing and operating a full end-to-end CDN is prohibitive.

BRIEF SUMMARY OF THE INVENTION

According to the present invention, a CDN service provider shares its CDN infrastructure with a network to enable a network service provider (NSP) to offer a private-labeled network content delivery network (NCDN or "private CDN") to participating content providers. The CDNSP preferably provides the hardware, software and services required to build, deploy, operate and manage the CDN for the NCDN customer. Thus, the NCDN customer has access to and can make available to participating content providers one or more of the content delivery services (e.g., HTTP delivery, streaming media delivery, application delivery, and the like) available from the global CDN without having to provide the large capital investment, R&D expense and labor necessary to successfully deploy and operate the network itself. Rather, the global CDN service provider simply operates the private CDN for the network as a managed service.

The CDNSP provides its NCDN customer with content delivery service for the NCDN's participating content providers in a so-called "on-net" manner, meaning that the content that is actually available to be delivered over the CDN is transported on the NSP's own network. When the NSP's private CDN is over-loaded, however, according to the invention the CDN service provider allows the NCDN to overflow onto the global CDN so that end users can still obtain the desired content in an efficient manner. When traffic is overflowed to and delivered over the global CDN, it is said to be "off-net." Thus, according to the present invention, one or more private CDNs share infrastructure of a larger CDN, which manages the private CDNs and makes its potentially global network available to handle off-net overflow traffic.

In a conventional content delivery network implementation, the CDN service provider may already have its content servers located "on-net," i.e., in the NSP's network, which simplifies the provisioning of the private CDN. Typically, the CDN service provider has purchased bandwidth (transmission capacity) from the NSP to enable the CDNSP to provide delivery over the network (for the CDN's participating content providers). A typical CDN has business relationships with numerous networks, each of which provide bandwidth (for a fee or otherwise) to the CDN. According to another aspect of the present invention, the CDN service provider aggregates into an "off-net" bandwidth pool the bandwidth that is available to it from one or more of the NSPs that have deployed NCDNs and its other network partners. This enables the various NSPs (and, if desired, other networks) to exchange network capacity. A given NSP may sell its bandwidth into the pool for given consideration. The bandwidth pool is then made available to the NSPs so that a given NSP can purchase given off-net bandwidth for overflow and/or other purpose. In one embodiment, the CDNSP makes the bandwidth pool available in various tranches, e.g., a "partner" tranche (where off-net traffic is delivered over a given NSP's network), a "domestic" tranche (where off-net traffic is delivered on given domestic networks), an "international" tranche (where off-net traffic is delivered on given international networks), and the like. Different tranches may have different pricing and other contractual arrangements. By managing private CDNs for given NSPs, the CDN may facilitate content peering arrangements. In addition, the CDN service provider may operate an automated (e.g., online) bandwidth exchange wherein a participating NSP can post a price for their bandwidth and have other NSPs buy capacity, e.g., either on a Committed Information Rate (CIR) or overflow basis.

In a representative embodiment, a content delivery network service provider shares its infrastructure to enable network service providers to offer CDN services to participating content providers. One or more private CDNs are deployed, operated, and managed by the CDNSP on behalf of one or more respective network partners. The CDN service provider is paid to deploy, operate and manage the private CDN on behalf of the NSP. In addition, preferably the CDN service is paid by the network to deliver the network's off-net traffic to peers or to a bandwidth pool.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

Figure 1:
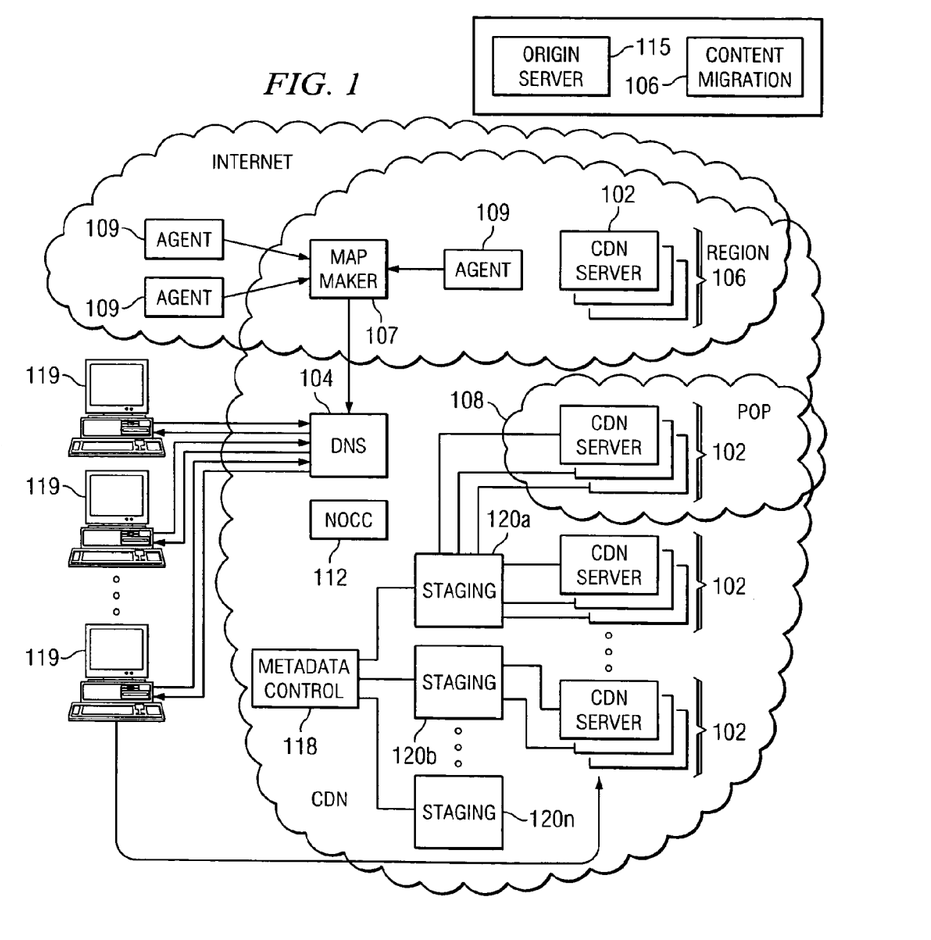
FIG. 1 is a diagram of a known content delivery network in which the present invention may be implemented.

As seen in FIG. 1, a known Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edges" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions.

In one service offering, available commercially from Akamai Technologies, Inc. of Cambridge, Mass., content is tagged for delivery from the CDN using a content migration or rewrite tool 106 operated, for example, at a participating content provider server. Tool 106 rewrites embedded object URLs to point to the CDNSP domain. A request for tagged content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In such case, the CDNSP may provide object-specific metadata to the CDN content servers to determine how the CDN content servers will handle a request for an object being served by the CDN. Metadata refers to a set of control options and parameters for the object (e.g., coherence information, origin server identity information, load balancing information, customer code, other control codes, etc.), and such information may be provided to the CDN content servers in various ways. In one approach, the CDNSP operates a metadata transmission system 116 comprising a set of one or more servers to enable metadata to be provided to the CDNSP content servers. The system 116 may comprise at least one control server 118, and one or more staging servers 120$a$-$n$, each of which is typically an HTTP server (e.g., Apache). Metadata is provided to the control server 118 by the CDNSP or the content provider (e.g., using a secure extranet application) and periodically delivered to the staging servers 120$a$-$n$. The staging servers deliver the metadata to the CDN content servers as necessary.

Figure 2:
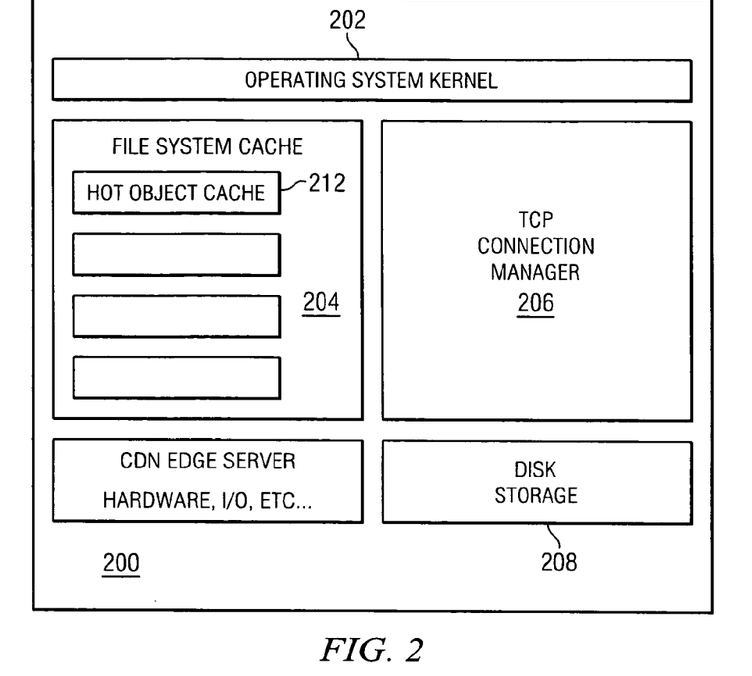
FIG. 2 is a simplified block diagram of a CDN server.

FIG. 2 illustrates a typical machine configuration for a CDN content edge server. For HTTP content, the content server 200 is a caching appliance running an operating system kernel 202, a file system cache 204, CDN software 206, TCP connection manager 208, and disk storage 210. CDN software 206, among other things, is used to create and manage a "hot" object cache 212 for popular objects being served by the CDN. In operation, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss.

Figure 3:
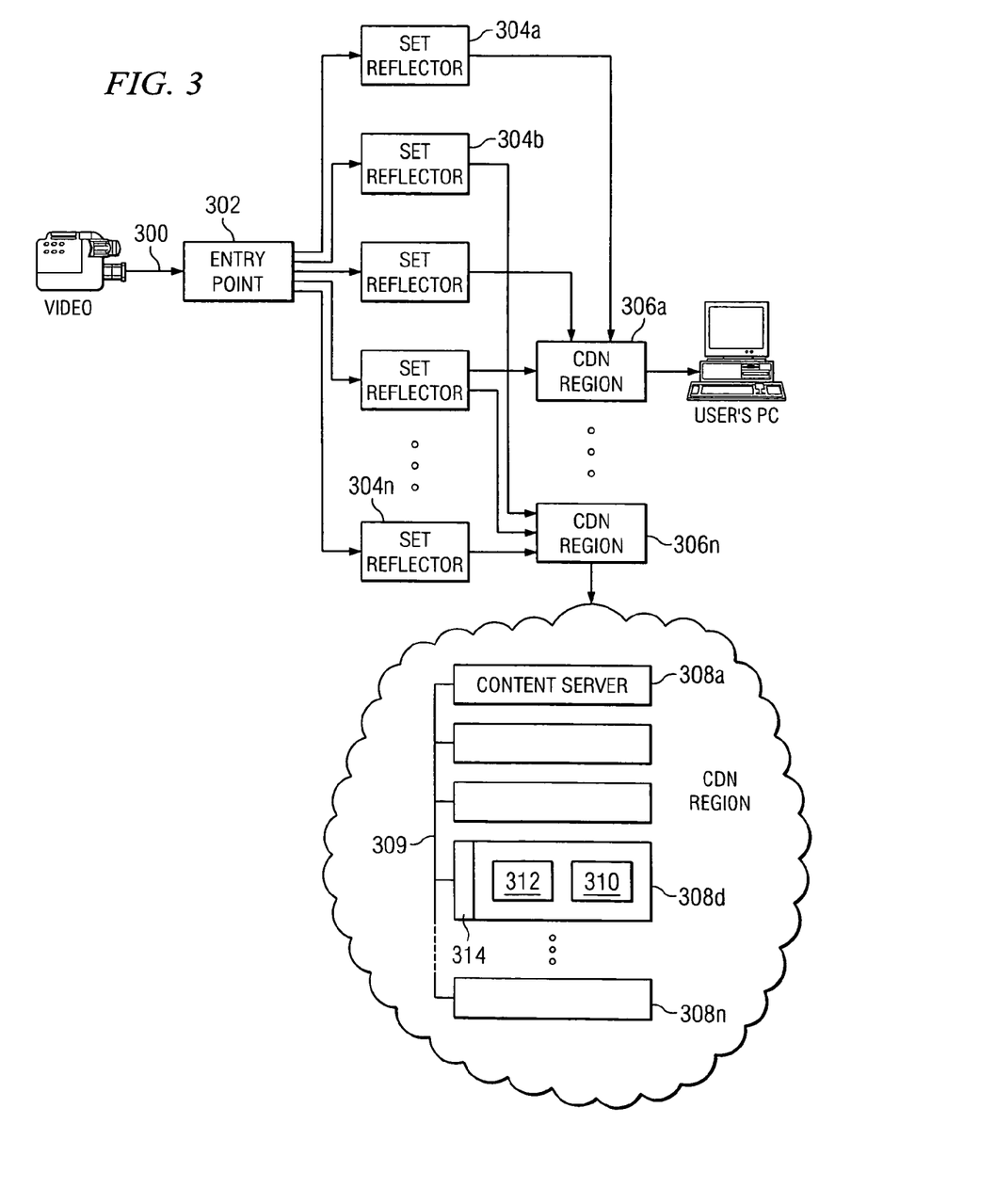
FIG. 3 is simplified diagram of a streaming media overlay network.

As described above, the Internet CDN may also provide live and on-demand streaming media. In one approach, the CDN incorporates a fan-out technique that allows the data comprising a given stream to be sent on multiple redundant paths when required to enable a given edge server to construct a clean copy of the stream when some of the paths are down or lossy. FIG. 3 illustrates the use of a so-called "reflector" transport network that implements such a process. This network is described in U.S. Pat. No. 6,751,673, titled "Streaming media subscription mechanism for a content delivery network."

As seen in FIG. 3, a broadcast stream 300 is sent to a CDN entry point 302. An entry point, for example, comprises two servers (for redundancy), and each server can handle many streams from multiple content providers. Once the entry point receives the stream, it rebroadcasts copies of the stream to set reflectors 304a-n. The streams are multiplexed and delivered to the set reflectors preferably via UDP (e.g., WMT encapsulated in RTSP encapsulated in UDP over IP). These set reflectors are preferably diverse from a network and geographic standpoint (e.g., at diverse Internet backbone data centers) to ensure fault tolerance. Each set reflector, in turn, rebroadcasts its copy of the stream to each subscribing region, e.g., region 306d, of a set of regions 306a-n. A subscribing region 306d is a CDN region that contains one or more streaming edge nodes 308a-n to which user(s) have been routed by the CDN request-routing mechanism. In other words, set reflectors send their streams to every edge region where they are needed. A CDN region, in this example, includes a set of edge nodes connected by a common backbone 309, e.g., a local area network (LAN). Typically, an edge node, e.g., node 308d, comprises a streaming server 312 and it may include a cache 310. A representative server runs an Intel processor, the Linux operating system and a Real Media or QuickTime Server. For Windows-based platforms, a representative server runs an Intel processor, Windows NT or 2000, and a Windows Media Server. As will be described, the edge node also runs control programs 314 to facilitate the subscription mechanism as described in the above-identified application.

Figure 4:
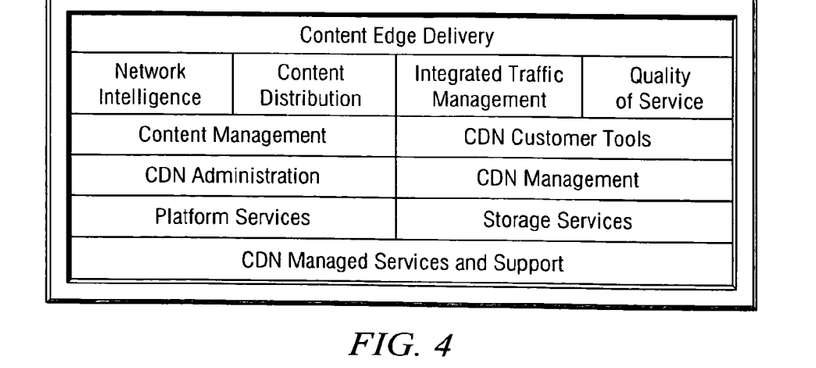
FIG. 4 is a block diagram of the basic CDN infrastructure services that are made available to the NSP according to the present invention.

Although not shown in detail, a typical content delivery network includes other infrastructure (servers, control facilities, applications, and the like) in addition to the HTTP and streaming delivery networks described above. Such infrastructure provides for an integrated suite of services and functions as set forth in the CDN "building block" diagram illustrated in FIG. 4. These services and function are representative, of course, and a given CDN need not include all of them or be implemented according to the configurations described above and illustrated in FIGS. 1-3. For purposes of the present invention, it is assumed that a content delivery network operates a distributed infrastructure on behalf of its participating content provider customers, typically leveraging the networks of various third party network service providers. Thus, for example, it is assumed that the CDN operates servers in various large (e.g., backbone) networks such as those owned and operated by such companies as: UUNet, AT&T, Qwest Communications, Cable & Wireless, Sprint, British Telecom, Deutsche Telecom, NTT, and the like. It is also assumed that a given NSP desires to offer content delivery to its own participating content providers (which, typically, will not be the same content providers that use the services of the global CDN).

Figure 5:
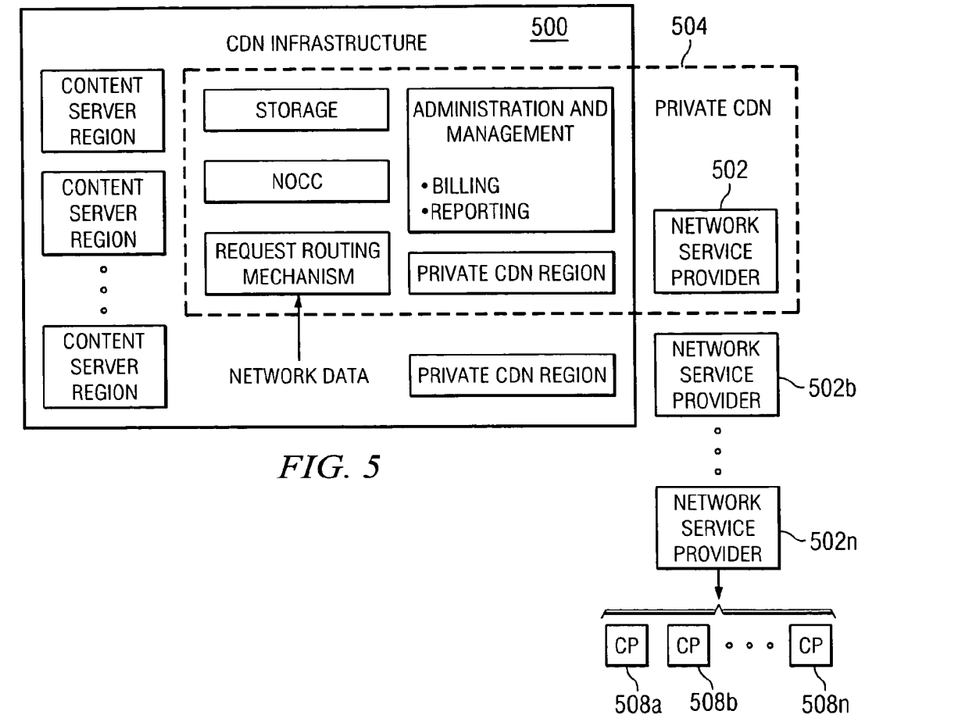
FIG. 5 is a simplified illustration of how a CDNSP provides a managed CDN on behalf of a network service provider (NSP) according to the present invention.

According to the present invention, and as illustrated in FIG. 5, the global CDN 500 shares its infrastructure with one or more NSPs 502a-n to enable each NSP to provide its participating content providers with a so-called "private CDN" 504. As illustrated, a given private CDN (or network content delivery network ("NCDN") preferably uses the CDN servers provisioned in the network 506. Participating content providers 508a-n migrate their content to the NCDN using tools, techniques or instructions provided or facilitated by the CDNSP, and the CDNSP deploys, operates and manages the NCDN on behalf of the NSP partner. Participating content providers 508 have their content made available from the private CDN (instead of from their origin servers), thus providing an enhanced end user experience and flash crowd protection for participating content provider web sites. Generalizing, the Content Delivery Network for Network Service Providers (NCDN) is a CDNSP-managed service that offers network service providers (NSPs) a turnkey content delivery network (CDN). The CDNSP preferably provides the hardware and software services required to build, deploy and manage a CDN for the NCDN customer. The NCDN customer is provided with their own fully branded CDN that has similar core functional capabilities for HTTP object and streaming delivery as does the CDNSP CDN. In particular, the CDNSP preferably provides to the NCDN customer (i.e., the NSP) the functional CDN capabilities illustrated, for example, in FIG. 4. These functional components are offered as an integrated solution for the NCDN customer to bring its own content delivery services to market.

Figure 6:
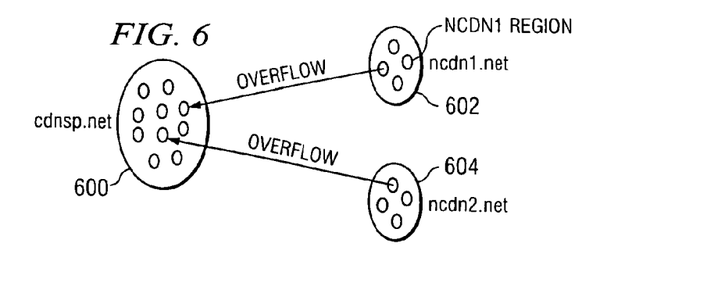
FIG. 6 illustrates how NCDNs are implemented using naming schemes that differ from the CDN.

As illustrated in FIG. 6, the CDNSP typically operates its set of content servers under a global CDN namespace 600, e.g., cdnsp.net. When an end user browser makes a name query against that domain, the CDN request routing mechanism returns the IP address of a CDN edge server that is not overloaded and that is likely to host the desired content. A representative technique is described in U.S. Pat. No. 6,108, 703, which is incorporated herein by reference. Network Service Providers (NSPs) in which they have their own separate namespaces 602 and 604 (e.g., ncdn1.net and ncdn2.net instead of cdnsp.net) and, optionally, their own branding. Preferably, the NSP leases its equipment from the CDNSP, and the NSP provides Tier 1 customer support to its own customers. Although not a requirement, the NSP preferably does not have root access to its CDN machines, but contracts for the CDNSP to provide CDNSP-owned software and to operate their NCDN. The NSP may have a virtual Network Operations Control Center (NOCC) that gives it the ability to monitor their NCDN, but preferably all actual operating decisions are made by the CDNSP.

The NCDN has many advantages. It enables the NSP to provide its content provider customers with flash-crowd protection, it enables the NSP to diminish traffic within its network, and it provides good performance. An NSP may offer content delivery to its content provider customers at a lower cost than a CDNSP's premium service, as well as other benefits, because many of the NSP's customers may already be hosting their web sites with the NSP. As illustrated in FIG. 6, the NSP may rely on the CDNSP to handle overflow using the CDNSP's global network whenever the NSP's own smaller network cannot handle the load. Preferably, the CDNSP network does not overflow into the NSP's NCDN, and one NCDN will not be allowed to overflow into another NCDN. The CDNSP preferably invoices the NSP on a periodic basis, e.g., a monthly service charge, for operating the NCDN, and that fee may be based on the size of deployment, traffic served, or some other metric. In addition, CDNSP may charge the NSP for overflowing into the CDNSP network according to a fee structure, e.g., a structure that encourages the NSP to deploy more servers rather than to use CDNSP bandwidth.

As noted above, preferably the NCDN uses shared CDN infrastructure. Thus, auxiliary NCDN services, such as data aggregation, collection, log delivery, content management, customer portal services, and the like, use the CDNSP tools, machines, systems and processes. Some or all of the customer-facing services, however, may be labeled with the NSP's branding, rather than with the CDNSP's. Billing data for the NSP customers is provided by the CDNSP to the NSP in any convenient format, although preferably via an XML-formatted file transfer mechanism. To account for charges due to NCDN overflow to the CDNSP, the CDNSP billing database may include appropriate fields to identify the NSP's customer for the hit and whether the NSP or the CDNSP served the content. In one embodiment, the hostname portion of an embedded object URL (e.g., ncdn1.net, ncdn2.net, cdnsp.net, or the like) is logged by CDN content server to enable these fields to be populated by billing software. In addition, log-based alerts may warn when an NCDN customer has erred in migrating its content to the CDN, which might cause an NSP customer to use the CDNSP network improperly or one NSP's customer to use a different NSP's NCDN network.

By sharing the CDN infrastructure, the NCDN preferably uses the streaming network and, thus, the NSP also provides live and video-on-demand (VOD) streaming, perhaps in multiple formats such Real, Windows Media, and QuickTime. The NSP's preferably have at least several (e.g., three) entry points within their network for redundancy. Live streaming events preferably are managed (and charged for) by the CDNSP subject to CDNSP approval. Preferably, overflow is handled by the CDNSP network via a reflector subscription mechanism, such as the mechanism described in U.S. Pat. No. 6,751,673. In an illustrated embodiment, a limit is placed on the number of CDNSP servers on which the NCDN can overflow so that no load underestimation by the NSP can adversely impact the CDNSP's network. To handle VOD storage needs, the NSP may use its own storage network or, alternatively, the CDNSP's storage solution. An illustrated storage solution implemented within a content delivery network infrastructure may be the technique described in U.S. Pat. No. 7,340,505, titled "Content storage and replication in a managed Internet content storage environment."

As noted above, other CDN infrastructure support is provided to the NSP. Thus, for example, delivery over SSL may be provided using a generic SSL solution based on wildcard certificates and the Key Management Infrastructure. Service Level Agreement (SLA) monitoring for NCDN content delivery service may be implemented using, for example, redundant monitoring agents (a pair of servers in nearby datacenters) download test images from both the NSP's customer and the NSP's NCDN network. The minimum time for corresponding downloads from the two servers may then be used to determine whether the SLA conditions have been met. The CDNSP preferably monitors both the SLA from the CDNSP to the NSP, as well as from the NSP to its customers. The NSP-customer SLA may be modeled after the existing CDNSP-customer SLA. In one embodiment, the CDNSP-NSP SLA offers a given uptime guarantee, perhaps rebating any fees for the duration of any delivery outage. An NSP's virtual NOCC preferably provides simplified information on the status of each of the NCDN servers. It may have status windows to show machines that need to be fixed, overflow status, and the like. Detailed information preferably is displayed in the CNDSP NOCC. Preferably, the virtual NOCC does not have control of the NCDN software. The NSP's customers preferably access the CDNSP's customer portal (preferably a secure extranet application) for real-time reporting and historical data. Secure connections to the portal are made, for example, via an NCDN-branded domain, either by setting up separate portal machines or allocating additional IP addresses on existing portal machines.

Several different techniques may be used to "map" requests for NCDN content to the NCDN. In a first approach, referred to as overlay NCDN, the NSP does not have dedicated regions or machines. In this example, the NSP's content providers are just identifiable with separate mapping rules so that requests are simply mapped to a set of machines that serve the content and other non-NCDN content.

A second embodiment is sometimes referred to as an independent NCDN without overflow. In this embodiment, the NSP has a set of dedicated machines organized into regions, with each region being a set of CDN content servers sharing a back-end switch. These regions preferably are only used to deliver content of a specific service for private CDN requests. This type of solution may be over-provisioned to handle NCDN traffic spikes, and any overflow control mechanism in the CDN is modified to prevent overflow between the CDN and the NCDN.

Figure 7:
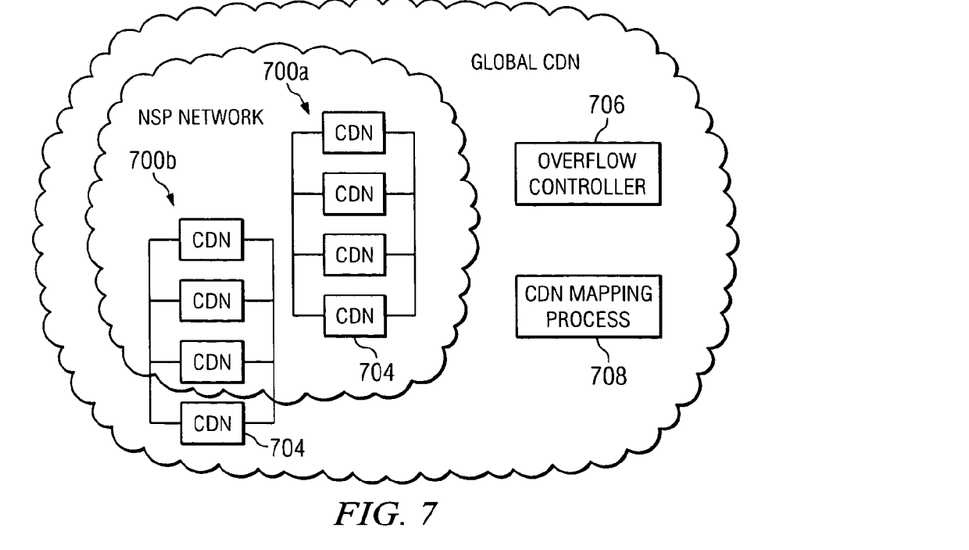
FIG. 7 illustrates a representative mapping mechanism to enable NCDNs to overflow onto the global CDN.

In a preferred embodiment, however, an independent NCDN has overflow capability. In this embodiment illustrated in FIG. 7, the NSP also has a separate set of one or more regions 700a-n, each of which include content servers 704 dedicated to the NCDN. This embodiment, however, also uses an overflow controller 706. In a representative implementation, the overflow controller 706 is a mechanism for overriding the assignment of clients to regions generated by a CDN mapping process 708. In particular, it is assumed that the CDN mapping process has the capability of assigning clients (typically, an end user's local name server) to CDN regions, each of which comprise a set of one or more content servers. The overflow controller 706 modifies these assignments under certain conditions. Thus, for example, when a region is receiving more than a given % of the load that it is deemed to be capable of serving (e.g., 75%), the overflow controller begins to spill traffic to other regions. Preferably, the overflow controller accomplishes this by instructing an individual low-level nameserver that is directing traffic into the region to begin directing traffic to another region. The low-level nameserver then joins a load-balancing group for the new region. If necessary, the overflow controller directs more than one low-level nameserver to direct traffic to another region, and different low-level nameservers may point to different regions. The overflow controller may comprise a group of machines, located on different backbones, each running the overflow controller process. These machines elect a leader, called the lead overflow controller, who is responsible for determining if any low-level nameservers should be redirected. The lead overflow controller determines which low-level nameservers should be redirected, and to where, e.g., by performing a minimum-cost flow calculation. The nodes in the graph are CDN regions.

Thus, in a preferred embodiment, separate maprules are used to cause overflow within an NCDN to favor the NCDN servers over CDNSP servers. A maprule is a set of rules for a type of content defining which CDNSP region (a subset of CDNSP servers that typically share a common backbone, such as a LAN, in a datacenter) may serve it. A maprule defines which regions should be used for a certain service and defines overflow preferences. In a simpler embodiment as noted above, an NCDN simply serves the NSP's customers out of the CDNSP network. As NCDN regions are added within the NSP's network, they are added to the CDNSP network as ordinary CDNSP regions. NCDN regions would then be prioritized over CDNSP regions using a maprule, but overflow from an NCDN region preferably is not prioritized to within the NCDN's other regions. In the preferred embodiment, as noted above, the NCDN is partitioned from the CDNSP network, and overflow is prioritized to within the NCDN.

The following describes additional details for an illustrative implementation.

Mapping and Load Balancing

It is required to determine proper maps for each NCDN and to use these maps to make load-balancing decisions. Because the ability of the NCDN to overflow into the CDNSP network when needed is an advantage of the NCDN product/service, an audit trail is preferably provided to justify any overflow into the CDNSP's network. In one embodiment, the NCDN uses a simple maprule that preferentially serves customers from the NCDN regions but which does not prioritize the NCDN regions during overflow. The CDNSP preferably includes a mapping mechanism that monitors the Internet and maps based on dynamic conditions. The mapping mechanism may use monitoring agents, such as servers that perform network traffic tests including traceroutes, pings, file downloads, and the like, to measure dynamic network conditions. Such data may then be used to assess which CDNSP regions are best, in terms of Quality of Service (QoS) performance, to serve content for each (NsIP, MapRule), where NsIP is the IP address of a requesting client's name server and the MapRule is a set of rules for a type of content defining which region may serve it. These maprules preferably encode the fact that content should be preferentially served from the NCDN regions. Preferably, the mapping mechanism is able to generate candidate regions (best data centers for delivering content) in the NCDN for each client name server (or group of name servers) so that a given scoring routine (based on some Q-o-S criteria) can provide sufficiently many scores within the NCDN for each group of client name servers, and so that, in turn, a region assignment can be made to map end users of NCDN content to an appropriate region. The particular algorithms and techniques for performing the actual region assignment are not part of the present invention. As the CDNSP deploys more NCDNs, it should ensure that the set of candidate regions for a specific client name server over all maprules does not grow too large, because otherwise too much network traffic testing may occur and/or become unwieldy.

Content Migration and Content Servers

Content providers served by an NCDN may utilize one or more content migration tools or other techniques to migrate content provider (CP) content to the NCDN. Preferably, each content provider is assigned a distinct CP-code from all other CP-codes using the same NCDN, another NCDN, or the CDNSP. A table may be used to provide the mapping from CP-code to legal domains on the content provider's origin server. Distribution of the legal domains to the CDNSP content servers may be provided by a metadata transmission system.

A CDNSP's content servers preferably are used for the NCDN. A conventional content server is a Pentium-based caching application with a large amount of RAM and disk storage.

For collecting data from CDNSP content server regarding the content served, preferably the CDNSP uses a log delivery service that logs host headers.

Distributed Data Collection

The CDNSP's billing of the NCDN may include a preference to prescribe a large bursting rate in the case of an overflow condition, whereby the NCDN (due to network traffic congestion) is permitted to serve content from the CDNSP network. The overflow degree is the difference between the traffic served by the NCDN's content servers and the total traffic served by the CDNSP's network for the particular NCDN's CP codes. Direct measurement of the overflow degree is highly desirable from an auditing perspective (both in reviewing billing and accidental misapplication of the content migration process by the NCDN's customer). Direct measurement may be accomplished by including an additional field in a log database application to collect host header names, which allows the CDNSP to use existing SQL queries to collate this data. Unique IDs may be assigned during the provisioning process of each NCDN. The new fields in the log database may be used, for example, to indicate what NCDN was named in the rebranded portion of the URL and to show out of what network the content was served.

Logging and Billing

A log database changes can be generated as follows: parse additional fields in logs, map modified URL hostname into NCDN code, map content server IP to NCDN code, and automate delivery into a distributed data collection (DDC) function. In addition to logging this data for the host header name, logging may raise alerts when an overflow condition exists.

For the NCDN's billing of their customers, a reseller approach may be utilized. For example, the CDNSP delivers to the NCDN on a monthly basis an XML file containing summarized traffic information for each of their CP-codes. The NCDN is then responsible for filtering this data and generating branded invoices for their customers.

Streaming

A reflector network as described in U.S. Pat. No. 6,751,673 may be provided for each NCDN. This network preferably comprises 3 distribution trees (to provide fault tolerance and redundancy), with at least 3 entry points. To support the requirement for the NCDN to be able to overflow onto the CDNSP network, the NCDN reflector network may be rate limited and will be mapped to overflow into no more than a small percentage of the CDNSP network. This restriction minimizes the impact on the CDNSP reflector network that would occur if the NCDN took on more load than both networks could handle.

Storage

Preferably, the NCDN uses the NSP's existing storage solution. NSP's preferably obtain storage in several ways, e.g.: NSPs that host web sites can provide storage "behind" the customer web site, and NSPs can provide storage servers "in front" of the customer web site to which the customer uploads content. For storage "behind" the web site, the customer web server accesses the storage directly. For storage "in front" of website, the CDNSP may require the NSP to use a CDNSP global load balancing mechanism service such as described in U.S. Ser. No. 10/113,183, identified above. This mechanism provides an IP-based access control for the NCDN storage customers. During provisioning of the NCDN, an appropriate CDNSP DNS entry for the NSP's storage servers is provided. Once this has been done, the NCDN can CNAME its customer names on their nameserver to the CDNSP DNS entry. Preferably, the NCDN is responsible for managing issues with their customer's uploads into the storage sites. This solution provides a level of anonymity to the storage servers and branding of the storage servers with the NSP's domain and customer names without any software modifications.

Performance Assurance and Agents

A basic approach to Service Level Agreements (SLAs) will be the use of two types of SLA's: Type 1—the SLA between the NSP and its customers (e.g., one for web content delivery, one for streaming media content delivery); Type 2—The SLA between the CDNSP and the NSP (e.g., one for web content delivery, one for streaming media content delivery).

Preferably, the CDNSP monitors the NCDN, alerts the NSP of any problems, and assists the NSP in developing a monitoring and alert policy with its customers.

NOCC Monitoring Applications

The monitoring of the NCDN by the CDNSP NOCC may provide region-level monitoring and region overflow monitoring. For region-level monitoring, the NOCC operating data is monitored, aggregated and used to update relevant NOCC GUI displays. The NOCC may assign the same or different priorities on NCDN and CDNSP alerts. There may also be a general prioritization of the form "CDNSP network is more important than any CDN" (or vice versa). There may be various types of alerts for NCDN operation including, e.g.: NCDN has only N % machines serving; NCDN is overflowing N % of traffic to CDNSP; NCDN not visible to NOCC (which will happen if there is a peering problem with the network), or the like. Of course, the above examples are merely representative. An indication whether the NCDN is overflowing into a CDNSP region may be provided.

NSP Virtual NOCC Applications

Preferably, the CDNSP limits the amount (and type) of data viewable by the NSP, although this is not a requirement. The data presented to the NSP's virtual NOCC may be the following: an "indicator" showing whether a particular server on the NCDN network is operational or non-operational and, by region, traffic served in megabits per second and hits per second. The definition of operational machines preferably includes suspended machines, and the only machines considered non-operational are those with hardware or connectivity problems.

Reporting

The CDNSP's realtime and historical data modules may be used. Preferably, logs are aggregated by the NCDN CP-codes and delivered to the NSP. The NSP is then responsible for filtering this data and providing it to the NCDN customers (i.e., participating content providers).

Thus, according to the present invention, a content delivery network shares its infrastructure by building and managing private content delivery (sub)-networks (an NCDN) for one or more network service providers (or other third parties). Although part of a shared infrastructure, each NCDN preferably comprises at least one private CDN region that is separate from the CDN regions that comprise the potentially global CDN. These private regions can share the same data centers and racks as some of the CDN regions but preferably have separate backend networks and may be tracked in the CDN system separately. This separation makes it possible to prevent off-net overflow from CDN regions, if desired. It might also be possible for off-net traffic to overflow into private CDN regions if the CDNSP chooses.

Sharing CDN infrastructure provides additional advantages to the CDN service provider. Typically, the CDN service provider has purchased bandwidth (transmission capacity) from the NSP to enable the CDNSP to provide delivery over the network (for the CDN's participating content providers). A typical CDN has business relationships with numerous networks, each of which provide bandwidth (for a fee or otherwise) to the CDN. According to another aspect of the present invention, the CDN service provider aggregates into an "off-net" bandwidth pool the bandwidth that is available to it from one or more of the NSPs that have deployed NCDNs and its other network partners. This enables the various NSPs (and, if desired, other networks) to exchange network capacity. A given NSP may sell its bandwidth into the pool for given consideration. The bandwidth pool is then made available to the NSPs so that a given NSP can purchase given off-net bandwidth for overflow and/or other purpose. In one embodiment, the CDNSP makes the bandwidth pool available in various tranches, e.g., a "partner" tranche (where off-net traffic is delivered over a given NSP's network), a "domestic" tranche (where off-net traffic is delivered on given domestic networks), an "international" tranche (where off-net traffic is delivered on given international networks), and the like. Different tranches may have different pricing and other contractual arrangements. By managing private CDNs for given NSPs, the CDN may facilitate content peering arrangements. In addition, the CDN service provider may operate an automated (e.g., online) bandwidth exchange wherein a participating NSP can post a price for their bandwidth and have other NSPs buy capacity, e.g., either on a Committed Information Rate (CIR) or overflow basis.

The following is a more concrete example of a representative bandwidth pooling exchange as contemplated by the present invention. In this example, the CDNSP offers the following options to its NSP customers that have bought an NCDN. As noted above, an NCDN is a private CDN based on the CDN infrastructure (in whole or in part) to otherwise sharing a common interface with the CDN of the CDNSP. If the NSP wishes to deliver some content from "off-net" servers, i.e., using servers on the global CDN of the CDNSP, the NSP pays the CDNSP given agreed-upon consideration. The rate paid, for example, may be based on the rate for another NSP where the particular servers in question are located. The CDNSP then aggregates groups of NSPs (aggregating across all or some networks where the CDNSP's servers are located) and offers "tranches" of NSP pricing. Thus, for example:

1. $350/Mbps for UUNET bandwidth
2. $300/Mbps for any NSP in which CDNSP servers are co-located
3. $400/Mbps for domestic Tier 1 NSPs
4. $500/Mbps for cable company NSPs
5. $700/Mbps for European telco NSPs
6. etc.

Of course, the above amounts and classifications are merely representative, as the CDNSP can designate any number of classifications and pricing variables as it desires.

To facilitate a bandwidth exchange, the CDNSP can offer a particular NSP NCDN customer reduced "off-net" bandwidth prices in exchange for cheaper bandwidth on the network of that NSP (which would then be resold to other NSP NCDN customers of the CDNSP). If the NSP customer offered to others enough "on-net" bandwidth, the NSP could, in theory, buy its "off-net" cost down to zero (or even be paid). Thus, a true CDN bandwidth exchange would be provided, with buyers and sellers of bandwidth, and the CDNSP getting a "spread" between buy and sell rates. The bid-ask prices for bandwidth on each participating NSP preferably are posted by the CDNSP over an online system, e.g., through web-based access through the CDNSP extranet portal.

The present invention may be implemented in any content delivery network. As noted above, preferably, the CDN includes mapping and load balancing software that uses dynamic monitoring of the system status (load, connectivity, etc.) and Internet conditions to direct end users (primarily via DNS) to an optimal region and then an optimal server in that region. In general, any request can be sent to any region, and the edge servers dynamically fetch content, run applications, and serve end-user requests. Additionally, the CDN may run several overlay networks to provide efficient and scalable communications between customers' web sites and the large CDN edge network. Some of these overlay networks are dynamically constructed of the edge regions themselves, while others may use specialized non-edge regions (e.g., the streaming fan-out network). A variety of side channels (e.g., the metadata transmission system) may also exist to efficiently deliver configuration and other data to the edge servers as well as to collect system state data for real-time monitoring and other functions. This CDN infrastructure is shared by a number of network service provider (NSP) partners, who each operate a private CDN for their participating content provider customers.

Having described our invention, what we claim is as follows:

1. Apparatus, comprising:
    a set of processors; and
    computer memory associated with each processor and holding computer program instructions that when executed by the processor comprise a content server, the content servers executing on the processors together comprising a private content delivery network associated with a network service provider (NSP) entity, where the private content delivery network enables the NSP entity to provide content delivery to content providers associated with the NSP entity;
    the content servers in the private content delivery network providing the content providers associated with the entity on-net content delivery over the private content delivery network; and
    one or more machines associated with the private content delivery network for managing content server data collection for the private content delivery network, for managing billing for the private content delivery network, and for providing a network operations center (NOC) for the private content delivery network.

2. The apparatus as described in claim 1 further including a set of processors, and computer memory associated with each processor and holding computer program instructions that when executed by the processor comprise a content delivery network (CDN) server, the CDN content servers executing on the processors together comprising an Internet content delivery network associated with a content delivery network service provider distinct from the network service provider.

3. The apparatus as described in claim 2 wherein the CDN content servers provide additional delivery capacity for the private content delivery network.

* * * * *